(12) United States Patent
Benjamin et al.

(10) Patent No.: US 12,499,288 B2
(45) Date of Patent: *Dec. 16, 2025

(54) TECHNIQUES FOR AUTOMATICALLY GENERATING URBAN AND NEIGHBORHOOD DESIGNS

(71) Applicant: AUTODESK, INC., San Francisco, CA (US)

(72) Inventors: David Benjamin, Brooklyn, NY (US);
James Stoddart, Atlanta, GA (US);
Lorenzo Villaggi, Brooklyn, NY (US);
Danil Nagy, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/693,920

(22) Filed: Mar. 14, 2022

(65) Prior Publication Data
US 2022/0198087 A1 Jun. 23, 2022

Related U.S. Application Data

(63) Continuation of application No. 16/182,557, filed on Nov. 6, 2018, now Pat. No. 11,275,872.
(Continued)

(51) Int. Cl.
*G06F 30/13* (2020.01)
*G06N 3/126* (2023.01)
(Continued)

(52) U.S. Cl.
CPC ............. *G06F 30/13* (2020.01); *G06N 3/126* (2013.01); *G06Q 10/06313* (2013.01);
(Continued)

(58) Field of Classification Search
CPC .. G06F 30/13; G06F 3/04815; G06F 3/04847; G06F 2111/02; G06F 2111/04;
(Continued)

(56) References Cited

U.S. PATENT DOCUMENTS

| | | |
|---|---|---|
| 7,164,883 B2 | 1/2007 | Rappaport et al. |
| 9,697,326 B1 | 7/2017 | Bowman et al. |

(Continued)

FOREIGN PATENT DOCUMENTS

| | | | | |
|---|---|---|---|---|
| CN | 1381660 A | * | 11/2002 | ........... E04B 1/0046 |
| CN | 2895621 Y | | 5/2007 | |

(Continued)

OTHER PUBLICATIONS

Shi et al., "A review of Simulation-Based Urban form Generation and Optimization for Energy-Driven Urban Design", Building and Environment, vol. 121, May 9, 2017, pp. 119-129.

(Continued)

*Primary Examiner* — Chuen-Meei Gan
(74) *Attorney, Agent, or Firm* — Artegis Law Group, LLP

(57) ABSTRACT

An urban design pipeline automatically generates design options for an urban design project based on a financial model. The urban design pipeline includes a geometry engine that generates candidate designs to meet various design criteria and design objectives associated with the urban design project. The urban design pipeline also includes an evaluation engine that evaluates the candidate designs based on the financial model. The financial model quantifies the financial performance of any given candidate design. The urban design pipeline operates iteratively to improve the candidate designs until one or more convergence criteria are met, thereby generating a set of design options with acceptable financial performance.

18 Claims, 7 Drawing Sheets

Related U.S. Application Data

(60) Provisional application No. 62/584,711, filed on Nov. 10, 2017.

(51) Int. Cl.
| | |
|---|---|
| *G06Q 10/0631* | (2023.01) |
| *G06Q 40/12* | (2023.01) |
| *G06Q 50/16* | (2012.01) |
| *G06F 3/04815* | (2022.01) |
| *G06F 3/04847* | (2022.01) |
| *G06F 111/02* | (2020.01) |
| *G06F 111/04* | (2020.01) |
| *G06F 111/06* | (2020.01) |
| *G06F 111/20* | (2020.01) |
| *G06T 15/00* | (2011.01) |
| *G06T 17/05* | (2011.01) |

(52) U.S. Cl.
CPC ........... *G06Q 40/12* (2013.12); *G06Q 50/165* (2013.01); *G06F 3/04815* (2013.01); *G06F 3/04847* (2013.01); *G06F 2111/02* (2020.01); *G06F 2111/04* (2020.01); *G06F 2111/06* (2020.01); *G06F 2111/20* (2020.01); *G06T 15/005* (2013.01); *G06T 17/05* (2013.01)

(58) Field of Classification Search
CPC . G06F 2111/06; G06F 2111/20; G06N 3/126; G06Q 10/06313; G06Q 40/12; G06Q 50/165; G06T 15/005; G06T 17/05
See application file for complete search history.

(56) References Cited

U.S. PATENT DOCUMENTS

| | | | |
|---|---|---|---|
| 10,074,145 B2 | 9/2018 | Budlong | |
| 10,255,383 B2 | 4/2019 | Gavini et al. | |
| 10,452,790 B2 | 10/2019 | Kim et al. | |
| 10,747,913 B2 | 8/2020 | Iorio | |
| 10,885,236 B2 | 1/2021 | Cheong et al. | |
| 11,144,681 B2 | 10/2021 | Benjamin et al. | |
| 11,275,872 B2 | 3/2022 | Benjamin et al. | |
| 11,574,093 B2 | 2/2023 | Hoyer et al. | |
| 11,593,533 B2 | 2/2023 | Grossman et al. | |
| 2004/0143428 A1* | 7/2004 | Rappaport | H04L 41/12 703/22 |
| 2005/0108982 A1* | 5/2005 | Formisano | G06Q 10/06313 52/741.1 |
| 2006/0294062 A1 | 12/2006 | Folchetti et al. | |
| 2010/0058268 A1 | 3/2010 | Fein et al. | |
| 2010/0106674 A1* | 4/2010 | McLean | F24F 11/46 706/52 |
| 2010/0217565 A1 | 8/2010 | Wayne et al. | |
| 2011/0251934 A1* | 10/2011 | Satyavolu | G06Q 40/12 705/30 |
| 2012/0173209 A1 | 7/2012 | Krebs et al. | |
| 2012/0271784 A1 | 10/2012 | McLean et al. | |
| 2012/0330621 A1* | 12/2012 | Detwiler | G06F 30/13 703/1 |
| 2013/0132440 A1 | 5/2013 | Carlson et al. | |
| 2014/0107851 A1 | 4/2014 | Yoon et al. | |
| 2014/0278280 A1 | 9/2014 | Pardo-Fernandez | |
| 2014/0355463 A1 | 12/2014 | Smith et al. | |
| 2015/0066442 A1* | 3/2015 | Pryor | G06Q 50/16 136/251 |
| 2019/0147116 A1 | 5/2019 | Benjamin et al. | |
| 2019/0147117 A1 | 5/2019 | Benjamin et al. | |
| 2019/0147118 A1 | 5/2019 | Benjamin et al. | |
| 2019/0147119 A1 | 5/2019 | Benjamin et al. | |
| 2019/0147120 A1 | 5/2019 | Benjamin et al. | |
| 2019/0325086 A1 | 10/2019 | Grossman et al. | |
| 2019/0347080 A1 | 11/2019 | Benjamin et al. | |
| 2020/0013127 A1 | 1/2020 | Gozes et al. | |
| 2020/0210533 A1 | 7/2020 | Markiz | |
| 2021/0150083 A1 | 5/2021 | Benjamin et al. | |
| 2021/0150084 A1 | 5/2021 | Benjamin et al. | |
| 2021/0150085 A1 | 5/2021 | Benjamin et al. | |
| 2021/0241864 A1 | 8/2021 | Bhattacharya et al. | |
| 2022/0198087 A1 | 6/2022 | Benjamin et al. | |

FOREIGN PATENT DOCUMENTS

| | | | | |
|---|---|---|---|---|
| CN | 100452071 C | 1/2009 | | |
| CN | 101782399 A | 7/2010 | | |
| CN | 101545321 B | 12/2010 | | |
| CN | 102368309 A | 3/2012 | | |
| CN | 102663800 A | 9/2012 | | |
| CN | 102750411 A | 10/2012 | | |
| CN | 103020741 A | 4/2013 | | |
| CN | 102521443 B | 5/2013 | | |
| CN | 104631243 A | 5/2015 | | |
| CN | 105205283 A | 12/2015 | | |
| CN | 105761192 A | 7/2016 | | |
| CN | 105825003 A | 8/2016 | | |
| CN | 105894553 A | 8/2016 | | |
| CN | 106251020 A | 12/2016 | | |
| CN | 106446000 A | 2/2017 | | |
| CN | 106599332 A | 4/2017 | | |
| CN | 106909986 A | 6/2017 | | |
| CN | 106952330 A | 7/2017 | | |
| CN | 107016221 A | 8/2017 | | |
| CN | 107133900 A | 9/2017 | | |
| JP | 2012-518838 A | 8/2012 | | |
| KR | 20110054221 A | 5/2011 | | |
| KR | 101173158 B1 * | 9/2012 | | G06Q 50/08 |
| WO | 00/00919 A1 | 1/2000 | | |
| WO | 00/57004 A1 | 9/2000 | | |
| WO | WO 0167372 A1 * | 9/2001 | | G06F 30/17 |
| WO | 2005069174 A1 | 7/2005 | | |
| WO | 2006/088550 A2 | 8/2006 | | |
| WO | 2007/073641 A1 | 7/2007 | | |
| WO | 2011/035542 A1 | 3/2011 | | |
| WO | 2013/161824 A1 | 10/2013 | | |

OTHER PUBLICATIONS

Yusuf, Syed Adnan, "An Evolutionary AI-Based Decision Support System for Urban Regeneration Planning", URL: https://core.ac.uk/download/pdf/40034719.pdf, Chapters 5-7, Mar. 1, 2010, pp. 155-235.

Aliaga et al., "Interactive Example-Based Urban Layout Synthesis", ACM Transactions on Graphics (TOG), ACM, US, vol. 27, No. 5, Article 160, Dec. 1, 2008, pp. 1-10.

Anonymous: "Grid plan—Wikipedia", URL:https://en.wikipedia.org/w/index.php?title=Grid plan&oldid=808141305, Nov. 1, 2017, pp. 1-19.

Wang et al., "Restructuring surface tessellation with irregular boundary conditions", Frontiers of Architectural Research, vol. 3, No. 4, Dec. 1, 2014, pp. 337-347.

Vanegas et al., "Visualization of Simulated Urban Spaces: Inferring Parameterized Generation of Streets, Parcels, and Aerial Imagery", IEEE, May 2009, pp. 424-435.

Hartmann et al., "Content-Aware Re-targeting of Discrete Element Layouts", Hartmann, WSCG 2015, Conference on Computer Graphics, Visualization and Computer Vision, 2015, pp. 173-182.

Sosa et al., "Urban grid forms as a strategy for reducing heat island effects in arid cities", Sustainable Cities and Society, Jul. 2017, pp. 547-556.

Lezama et al., "Vanishing Point Detection in Urban Scenes Using Point Alignments", Image Processing on Line on Jul. 14, 2017, 2017, pp. 131-164.

Shen et al., "Urban function connectivity: Characterisation of functional urban streets with social media check-in data", Jun. 2016, pp. 9-21.

Oshima et al., "Geometry reconstruction and mesh generation techniques for acoustic simulations over real-life urban areas using digital geographic information", Acoust. Sci. & Tech. 35, 2014, pp. 108-118.

(56) References Cited

OTHER PUBLICATIONS

Martin et al., From solar constraints to urban design opportunities: Optimization of built form typologies in a Brazilian tropical city, pp. 43-56.
Parish et al., "Procedural Modeling of Cities", ACM SIGGRAPH 001, pp. 301-308.
Ferreira et al., "Urbane: A 3D Framework to Support Data Driven Decision Making in Urban Development", IEEE Conference on Visual Analytics Science and Technology 2015, pp. 97-104.
Gracik et al., "Effect of urban neighborhoods on the performance of building cooling Systems", Stefan Gracik et al., Building and Environment, Mar. 2015, pp. 15-29.
Chang et al., "Legible Simplification of Textured Urban Models", Remco Chang et al., IEEE Computer Graphics and Applications, 2008, pp. 27-36.
Sven Schneider: "Automatisierte Erzeugung raumlicher Konfigurationen in Architekturund Stadtebau auf Basis sichtbarkeitsbasierter Raumreprasentationen Dissertation", May 31, 2016, pp. 105-169.
Urquizo et al., "Metrics of urban morphology and their impact on energy consumption: A case study in the United Kingdom", Energy Research & Social Science, vol. 32, 2017, pp. 193-206.
Marler et al., "The weighted sum method for multi-objective optimization: new insights", Struct Multidisc Optim, DOI 10.1007/s00158-009-0460-7, vol. 41, 2010, pp. 853-862.
ArcGIS—Wikipedia, the free encyclopedia, retrieved from https://en.wikipedia.org/wiki/ArcGIS, 2016, 9 pages.
Wikipedia,"ModeFrontier", https://en.wikipedia.org/wiki/ModeFRONTIER, 2021, 1 page.
Esteco Technology,"Simulation Process Integration and Automation", https://engineering.esteco.com/technology/simulation-process-integration-automation/, showing ModeFrontier being integrated with CAD Applications, 2021, 5 Pages.
Beiro, Jose Nuno., "Citymaker", Designing grammars for urban design, ABE Archit. Built Environ. vol. 2, No. 5, Oct. 2012, 276 pages.
Non Final Office Action received for U.S. Appl. No. 17/343,566 dated May 2, 2023, 47 pages.
Non Final Office Action received for U.S. Appl. No. 17/342,309 dated May 1, 2023, 44 pages.
Non Final Office Action received for U.S. Appl. No. 17/531,622 dated May 19, 2023, 44 pages.
Final Office Action received for U.S. Appl. No. 16/184,972 dated Jan. 13, 2023, 29 pages.
Final Office Action received for U.S. Appl. No. 17/342,309 dated Dec. 13, 2023, 17 pages.
Notice of Allowance received for U.S. Appl. No. 17/343,566 dated Aug. 16, 2023, 15 pages.
Non Final Office Action received for U.S. Appl. No. 17/342,309 dated Aug. 25, 2023, 12 pages.
Final Office Action received for U.S. Appl. No. 17/531,622 dated Aug. 28, 2023, 14 pages.
Notice of Allowance received for U.S. Appl. No. 16/184,972 dated Aug. 29, 2023, 21 pages.
Notice of Allowance received for U.S. Appl. No. 16/184,974 dated Mar. 15, 2021, 24 pages.
Non Final Office action received for U.S. Appl. No. 16/184,975, dated Mar. 24, 2021, 35 pages.
Notice of Allowance received for U.S. Appl. No. 16/181,224 dated Mar. 3, 2021, 17 pages.
Notice of Allowance received for U.S. Appl. No. 16/184,974 dated Jun. 17, 2021, 21 pages.
Non Final Office action received for U.S. Appl. No. 16/184,972 dated May 27, 2021, 37 pages.
Notice of Allowance received for U.S. Appl. No. 16/181,224 dated Jun. 9, 2021, 17 pages.
Notice of Allowance received for U.S. Appl. No. 16/184,975, dated Jul. 16, 2021, 17 pages.
Notice of Allowance received for U.S. Appl. No. 16/182,557, dated Oct. 26, 2021, 28 pages.
Final Office Action received for U.S. Appl. No. 16/184,972 dated Dec. 2, 2021, 31 pages.
Non Final Office Action received for U.S. Appl. No. 16/184,972 dated Jun. 9, 2022, 35 pages.
Notice of Allowance received for U.S. Appl. No. 16/184,972 dated Dec. 1, 2023, 21 pages.
Notice of Allowance received for U.S. Appl. No. 17/531,622 dated Jan. 26, 2024, 21 pages.
Non Final Office Action received for U.S. Appl. No. 17/342,309 dated Mar. 28, 2024, 21 pages.
Notice of Allowance received for U.S. Appl. No. 16/184,972 dated Jul. 5, 2024, 14 pages.
Notice of Allowance received for U.S. Appl. No. 17/342,309 dated Jul. 19, 2024, 18 pages.

\* cited by examiner

TECHNIQUES FOR AUTOMATICALLY GENERATING URBAN AND NEIGHBORHOOD DESIGNS

CROSS-REFERENCE TO RELATED APPLICATIONS

This application is a continuation of the co-pending U.S. patent application titled, "TECHNIQUES FOR AUTOMATICALLY GENERATING URBAN AND NEIGHBORHOOD DESIGNS," filed on Nov. 6, 2018, and having Ser. No. 16/182,557, which claims priority benefit of the United States Provisional Application titled "GENERATIVE DESIGN TECHNIQUES FOR URBAN AND NEIGHBORHOOD PLANNING," filed Nov. 10, 2017, and having Ser. No. 62/584,711. The subject matter of these related applications is hereby incorporated herein by reference.

BACKGROUND

Field of the Various Embodiments

Embodiments of the present invention relate generally to computer-aided design technology and, more specifically, to techniques for automatically generating urban and neighborhood designs.

Description of the Related Art

A traditional design process for an urban design project usually involves a design phase followed by a financial analysis phase (or sometimes a financial analysis phase followed by a design phase). During the design phase, a designer generates one or more designs for developing a property. For example, the designer could plan the placement and organization of a number of houses to be built within a housing subdivision. The designer typically generates each design by manually and/or mentally making a number of design choices based on various design criteria and design objectives associated with the urban design project. A given design criterion could indicate, for example, a number of apartment units that should be built. A given design objective could indicate, for example, that population density should be maximized or above a target threshold. As a general matter, designers rely on intuition and experience when making the various design choices associated with the design phase of a traditional design process.

During the financial analysis phase of a traditional design process, a financial analyst evaluates each design generated during the design phase to estimate different financial metrics associated with those designs. For example, the financial analyst could estimate the total cost of developing the property in accordance with a given design based on the number of apartment complexes specified in the given design. In another example, the financial analyst could estimate the total revenue and the total profit that could be generated were the property developed in accordance with the given design. Based on the different financial metrics, the financial analyst determines which of the various designs, if any, meet a set of financial objectives. The set financial objectives could include, for example, a maximum cost associated with any given design or a minimum profit level that should be achieved by any given design, among others.

Once the financial analysis phase is complete, the designer oftentimes has to modify the designs generated during the design phase based on the results of the financial analysis phase. For example, suppose the financial analyst determines that a particular design does not meet a minimum profit level specified in the set of financial objectives. In view of that determination, the designer could modify that particular design to make that property developed in accordance with the design more valuable or profitable. In this manner, the design and analysis phases of the traditional design process can be performed iteratively until one or more designs are generated that meet the set of financial objectives.

One drawback of the iterative design process described above is that the overall process usually takes a long time to complete because the design and financial analysis phases are performed sequentially and by different persons having different specialties. Also, by definition, an iterative design process normally requires that the design and financial analysis phases be repeated multiple times in order to generate designs that meet the set of financial objectives. For example, during the analysis phase, the analyst could determine that none of the designs generated during the design phase meet the set of financial objectives. In view of that determination, the designer would have to start from scratch and repeat the design phase to generate new designs, and the analyst would then need to repeat the financial analysis phase to determine whether those new designs meet the set of financial objectives.

In other cases, the financial analysis phase comes before the design phase. In such cases, the financial analysis phase may result in a bias toward certain design options and may rule out other design options. Consequently, by the time the designer begins the design phase, certain valid and/or beneficial possibilities for design options may be difficult or impossible to explore. Regardless of which phase occurs first, the traditional design process suffers from a linear, sequential operation, depends on people with different specialties, narrows the possible design options, and involves many back-and-forth cycles.

As the foregoing illustrates, what is needed in the art are more effective techniques for generating multi-dimensional designs for urban design projects without excessive expenditure of time.

SUMMARY

Various embodiments include a computer-implemented method for generating designs for an urban design project via a computer-aided design (CAD) application, the method comprising generating, via a geometry engine included in the CAD application, first geometry associated with a first candidate design, wherein the first geometry meets a first design criterion associated with a region of land, generating, via an evaluation engine included in the CAD application, a first metric for the first candidate design based on a financial model, wherein the first metric indicates a first amount of capital associated with developing the region of land according to the first candidate design, determining that the first metric does not meet a second design criterion that is associated with the financial model, automatically modifying, via the geometry engine, the first geometry based on the first metric to generate second geometry associated with a second candidate design, wherein the second metric indicates a second amount of capital associated with developing the region of land according to the second candidate design, and determining that the second metric meets the second design criterion, thereby indicating that the second candidate design is a higher ranked design than the first candidate design.

At least one technological advantage of the disclosed urban design pipeline is that design options can be automatically generated to meet the financial objectives of the urban design project. Accordingly, design options can be generated much faster than conventional approaches that require multiple sequential phases and multiple specialists.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, a traditional design process for an urban design project typically involves a design phase followed by a financial analysis phase. During the design phase, a designer generates one or more designs. Then, during the financial analysis phase, a financial analyst evaluates those designs to determine financial performance. The traditional design process typically takes a long time to complete because the design and financial analysis phases must be performed sequentially and typically involve two different specialists. In addition, if the design phase yields designs that do not adequately meet a set of financial objectives, then the design phase must be repeated, possibly numerous times, until designs are produced that do, in fact, meet the financial objectives.

To address these issues, embodiments of the invention include an urban design pipeline that automatically generates design options for an urban design project based on a financial model. The urban design pipeline includes a geometry engine that generates candidate designs to meet various design criteria and design objectives associated with the urban design project. The urban design pipeline also includes an evaluation engine that evaluates the candidate designs based on the financial model. The financial model quantifies the financial performance of any given candidate design. The urban design pipeline operates iteratively to improve the candidate designs until one or more convergence criteria are met, thereby generating a set of design options with acceptable financial performance.

At least one technological advantage of the disclosed urban design pipeline is that design options can be automatically generated to meet the financial objectives of the urban design project. Accordingly, design options can be generated much faster than conventional approaches that require multiple sequential phases and multiple specialists. In addition, designers are no longer required to repeat the design phase of the design process in order to remedy underperforming designs. Also, the urban design pipeline helps to manage trade-offs between design benefits and financial benefits, which are both valuable but which are sometimes in competition with one another. Thus, the process of generating designs can be greatly expedited compared to conventional, manual techniques. These technological advantages represent multiple technological advancements relative to prior art approaches.

System Overview

Figure 1:
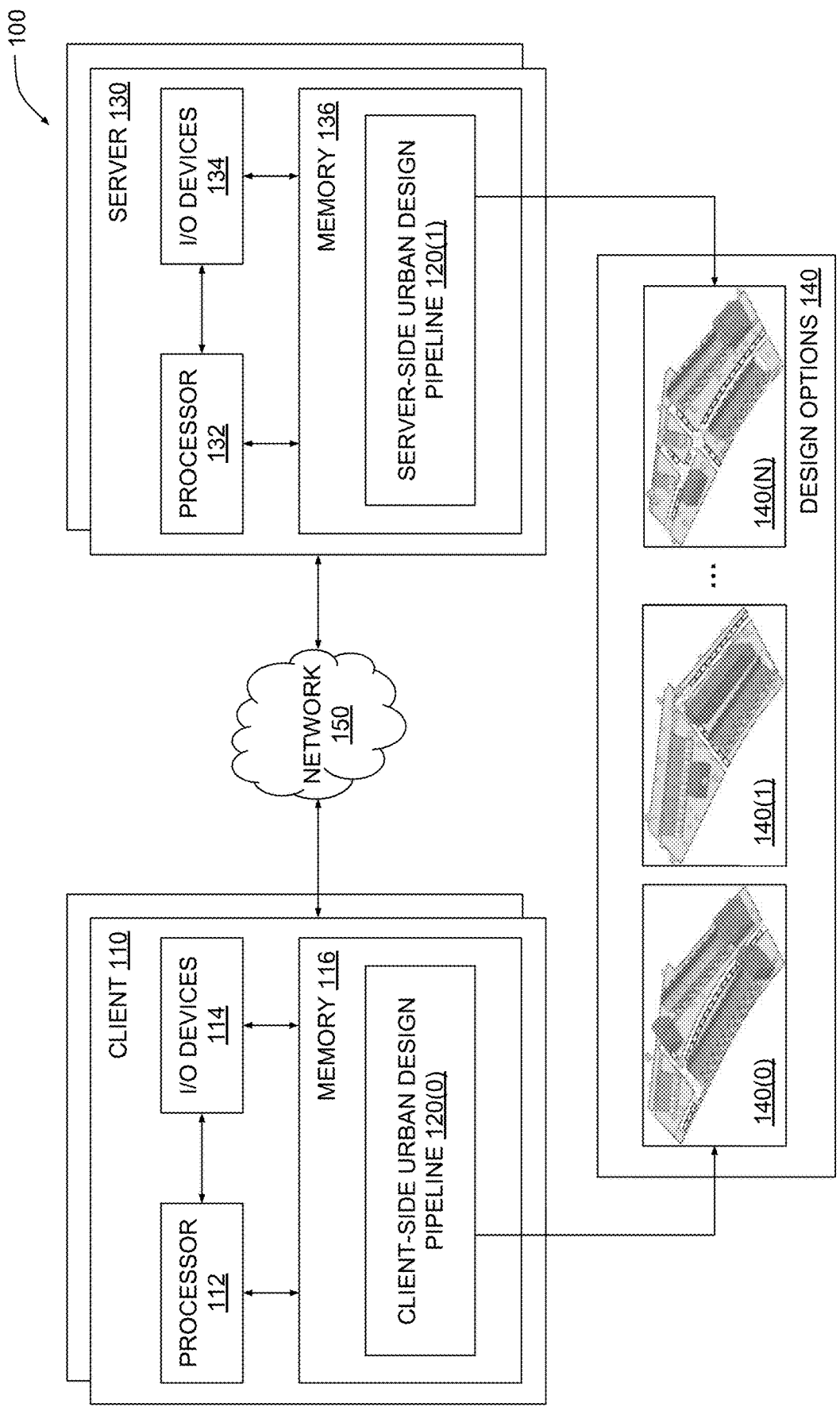
FIG. 1 illustrates a system configured to implement one or more aspects of the present invention.

FIG. 1 illustrates a system configured to implement one or more aspects of the present invention. As shown, a system 100 includes one or more clients 110 and one or more servers 130 configured to interoperate to generate a set of design options 140 for an urban design project. A given client 110 or a given server 130 may be any technically feasible type of computer system, including a desktop computer, a laptop computer, a mobile device, a virtualized instance of a computing device, a distributed and/or cloud-based computer system, and so forth. Clients 110 and servers 130 are coupled together via a network 150. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes client-side urban design pipeline 120(0). Client-side urban design pipeline 120(0) is a software application that, when executed by processor 112, causes processor 112 to participate in generating design options 140. In doing so, client-side urban design pipeline 120(0) interoperates with a corresponding client-side urban design pipeline 120(1) that resides within server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes server-side urban design pipeline 120(1). Server-side urban design pipeline 120(1) is a software application that, when executed by processor 132, causes processor 132 to participate in generating design options 140. In so doing, server-side urban design pipeline 120(1) interoperates with client-side urban design pipeline 120(0), as mentioned above.

In operation, one or more instances of client-side urban design pipeline 120(0) and one or more instances of server-side urban design pipeline 120(1) interoperate to generate multiple design options 140(0)-140(N). Each design option 140 describes a different development plan for developing a physical property to meet specific financial objectives set forth in a financial model. As a general matter, one or more client-side urban design pipelines 120(0) and one or more server-side urban design pipelines 120(1) collectively represent different portions of a distributed software entity. Thus, for simplicity, client-side urban design pipeline 120(0) and server-side urban design pipeline 120(1) will be collectively referred to herein as urban design pipeline 120. Urban design pipeline 120 is described in greater detail below in conjunction with FIG. 2.

Figure 2:
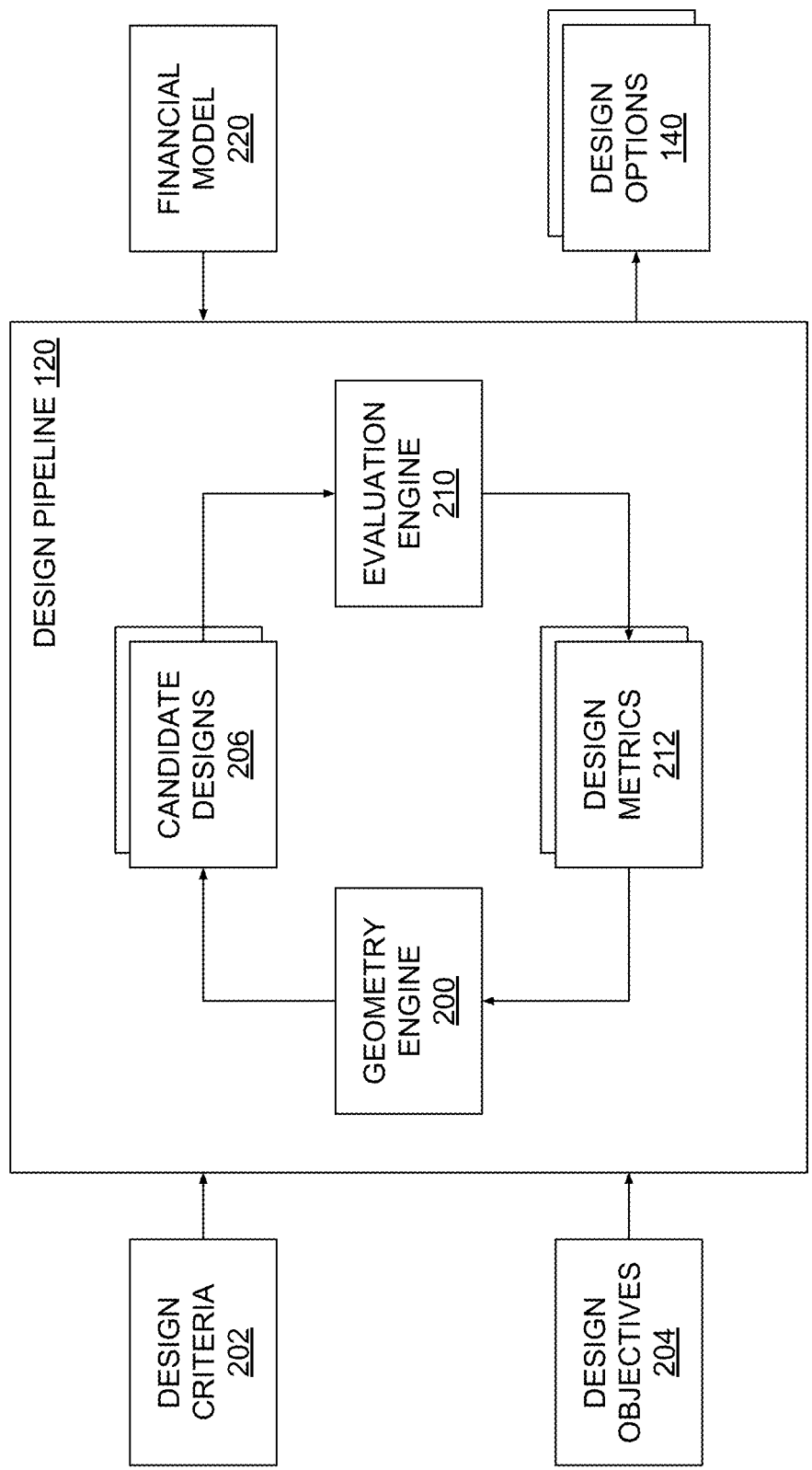
FIG. 2 is a more detailed illustration of the urban design pipeline of FIG. 1, according to various embodiments of the present invention.

FIG. 2 is a more detailed illustration of the urban design pipeline of FIG. 1, according to various embodiments of the present invention. As shown, urban design pipeline 120 includes a geometry engine 200 and an evaluation engine 210. Geometry engine 200 and evaluation engine 210 are configured to perform an iterative process to generate design options 140 based on design criteria 202, design objectives 204, and a financial model 220.

Design criteria 202 can include design constraints that generally describe features and/or attributes of designs that should be avoided when generating design options 140. A given design constraint could indicate, for example, regions of a physical property where the construction of structures cannot occur, a maximum number of floors for structures that cannot be exceeded, disallowed placement patterns for roadways, and so forth. Design constraints can be derived from local development regulations and/or building codes as well as directives received from one or more stakeholders in the urban design project.

Design criteria 202 can also include design requirements that generally describe features and/or attributes of designs that should be included within design options 140. A given design requirement could indicate, for example, one or more required orientations for structures, a number of parking lots needed for each structure, a target configuration for roadway intersections, and so forth. Design requirements can be derived from local development regulations and/or building codes as well as directives received from one or more stakeholders in the urban design project.

Design objectives 204 include a set of objective functions to be maximized or minimized when generating design options 140. A given objective function quantifies a specific attribute of a given design. In one embodiment, design objectives 204 may include objective functions that quantify solar energy collection, available sight lines associated with windows in structures, the size of yards associated with structures, the variety of neighborhoods, and the distribution of programs. Design objectives 204 include one or more financial objectives for candidate designs 206 that quantify various financial attributes of a given design. For example, a particular financial objective could be to minimize the cost of developing the physical property. A given financial objective can be evaluated based on financial model 220.

Financial model 220 is a data structure and/or set of functions that can be evaluated to estimate various amounts of capital associated with the development of a physical property according to a given candidate design 206, including costs, sources of revenue, and profit associated with that development. In one embodiment, financial model 220 may be a spreadsheet of data cells indicating various costs and sources of revenue associated with different elements of candidate designs 206 along with a set of functions for computing total cost, revenue, and profit for those designs. In another embodiment, financial model 220 is a financial pro forma. In practice, financial model 220 has any technically feasible structure and generally is provided by a stakeholder in the urban design project. Financial model 220 is described in greater detail below in conjunction with FIG. 3.

In operation, geometry engine 200 receives design criteria 202 and design objectives 204 and generates candidate designs 206 for the urban design project. Each candidate design 206 describes a different development plan for developing the physical property with various structures, roadways, and other fixtures associated with the urban design project. A given candidate design 206 meets some or all design criteria 202 and is therefore generally considered a feasible design. Candidate designs 206 also achieve design objectives 204 to varying degrees.

Evaluation engine 210 evaluates each candidate design 206 based on the objective functions included in design objectives 204 to generate design metrics 212. The design metrics 212 generated for a given candidate design 206 quantify the degree to which design objectives 204 are met by the given candidate design 206, especially the set of financial objectives mentioned. In one embodiment, design metrics 212 may also quantify the solar energy collection, available sight lines, yard size, neighborhood variety, and program distribution for the given candidate design 206.

When computing design metrics 212, evaluation engine 210 analyzes each candidate design 206 based on financial model 220 to determine the degree to which those candidate designs 206 meet the different financial objectives included in design objectives 204. For example, evaluation engine 210 could generate an estimated profit associated with a given candidate design 206 using financial model 220. Evaluation engine 210 could then determine a difference between the estimated profit and a target profit set forth in design objectives 204 to produce a design metric 212.

Geometry engine 200 analyzes design metrics 212 in conjunction with candidate designs 206 and then regenerates and/or modifies candidate designs 206 to generate improved versions of candidate designs 206 that better achieve design objectives 204 while still meeting design criteria 202.

For example, suppose evaluation engine 210 analyzes a given candidate design 206 using financial model 220 and determines that the estimated cost of developing the physical property based on the given candidate design 206 exceeds a target cost set forth in design objectives 204. Evaluation engine 210 would then generate a design metric 212 indicating that the given candidate design 206 underperforms relative to the design objective 204 corresponding to the target cost. Based on this design metric 212, geometry engine 200 would then generate one or more additional candidate designs 206 and/or modify the given candidate design 206 to generate improved candidate designs 206 with lower target costs. In this manner, geometry engine 200 and evaluation engine 210 would complete one iteration of urban design pipeline 120. In a subsequent iteration, evaluation engine 210 would generate design metrics 212 for the improved versions of candidate designs 206, and geometry engine 200 could again regenerate and/or modify candidate designs 206.

Geometry engine 200 and evaluation engine 210 iterate in this manner until one or more convergence criteria are met. When the convergence criteria are met, urban design pipeline 120 outputs the final set of candidate designs 206 as design options 140. In one embodiment, geometry engine 200 and evaluation engine 210 execute a multi-objective solver in order to generate and/or update candidate designs 206 until design metrics 212 reach specific threshold values specified in the convergence criteria.

One advantage of the approach described above is that candidate designs 206 and design options 140 are generated to meet specific financial objectives that can be evaluated based on financial model 220. Accordingly, a designer involved with the urban design project need not rely on a financial analyst to evaluate the financial performance of each candidate design 206 and/or design option 140. Another advantage is that the financial model 220 can be provided by stakeholders in the urban design project, thereby allowing candidate designs 206 and/or design options 140 to be evaluated based on customized and potentially proprietary information. Because urban design pipeline 120 operates automatically based on the various input data discussed above, designers can generate design options 140 much faster and with greater financial performance compared to conventional techniques. An exemplary financial model 220 can be used to generate design options 140 is described in greater detail below in conjunction with FIG. 3.

Exemplary Financial Model

Figure 3:
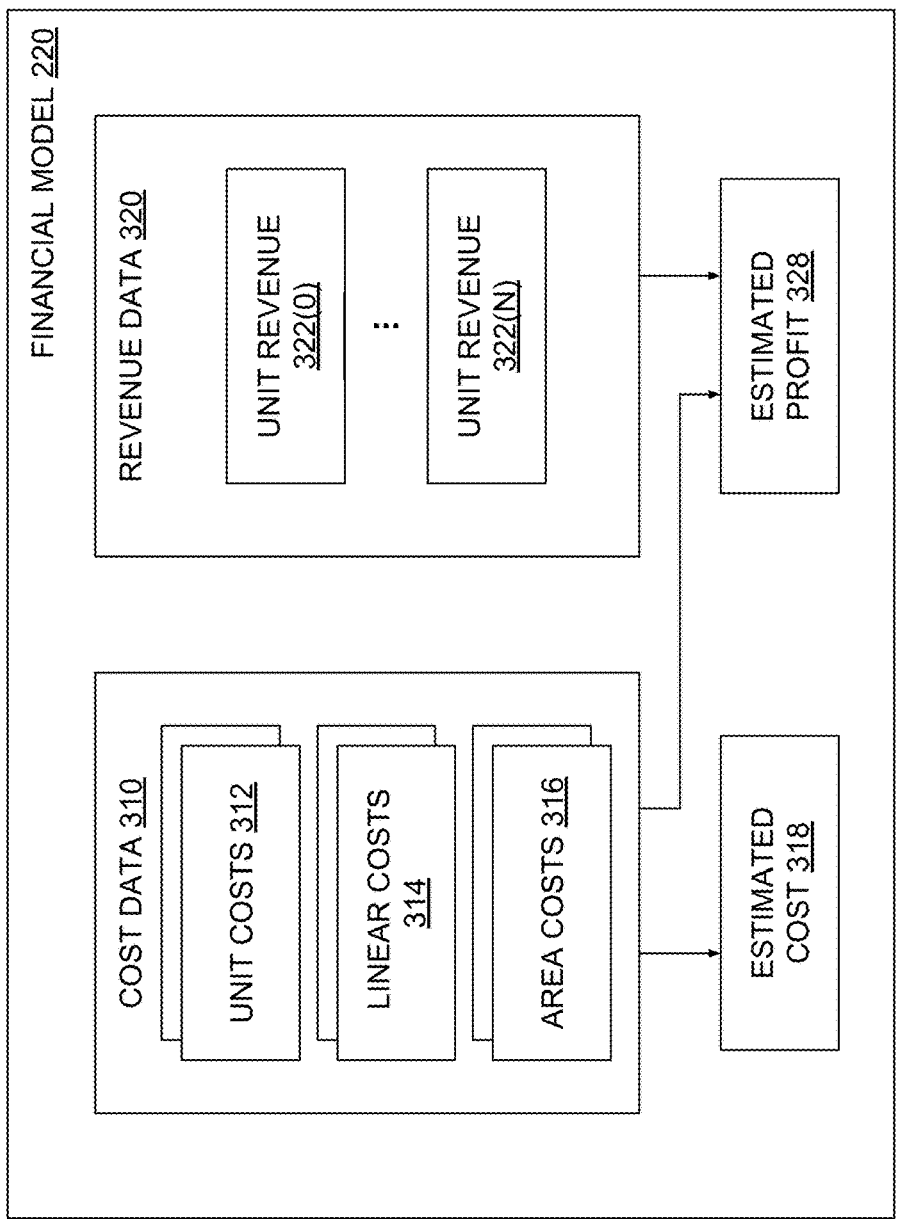
FIG. 3 illustrates one example of the financial model of FIG. 2, according to various embodiments of the present invention.
Figure 3:
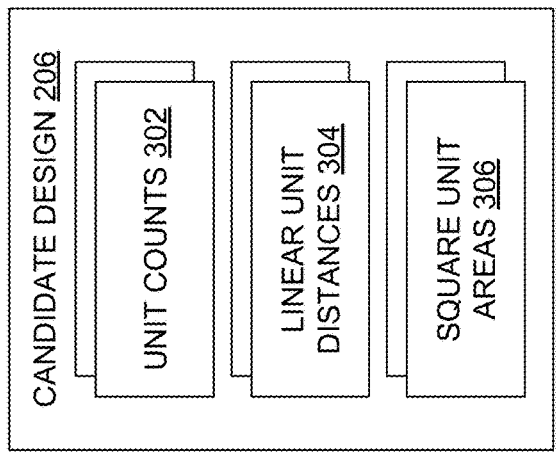

FIG. 3 illustrates one example of the financial model of FIG. 2, according to various embodiments of the present invention. As shown, financial model 220 includes cost data 310 and revenue data 320.

Cost data 310 tabulates various costs associated with the development of a physical property, including units costs 312, linear costs 314, and area costs 316. Unit costs 312 specify the cost per unit for different items or elements commonly included in urban development projects, such as a cost per parking space, a cost per house, a cost per apartment complex, and so forth. Linear costs 314 specify the cost per linear unit for linear portions of items or elements commonly included in urban development projects, such as a cost per linear unit of roadway, cost per linear unit of copper plumbing, a cost per linear unit of coaxial cable, and so forth. Area costs 316 specify the cost per area for square unit portions of items or elements commonly included in urban development projects, such as a cost per unit area of hardwood flooring, cost per unit area of exterior paint, a cost per unit area of parkland, and so forth.

Figure 4A:
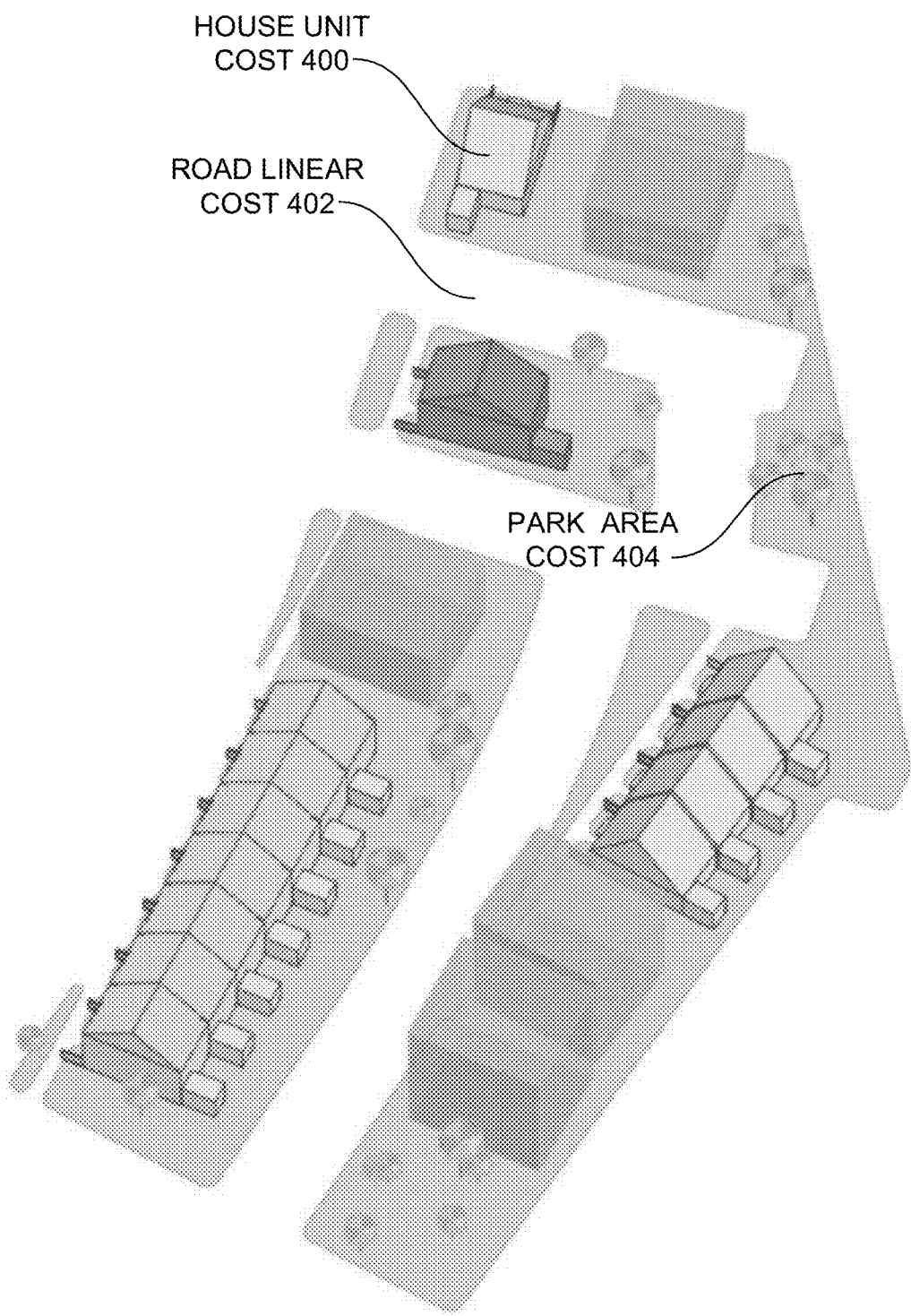
FIGS. 4A-4B illustrate how the urban design pipeline of FIG. 2 computes financial metrics for a design option, according to various embodiments of the present invention.

For example, referring now to FIG. 4A, house unit cost 400 indicates the total cost for building a house of a given type. House unit cost 400 could be computed by accumulating the individual costs for various elements needed to construct a given house, among other approaches. Road linear cost 402 indicates the total cost for constructing a linear section of roadway having a particular length. Road linear cost 402 could vary based on the type of road, number of lanes, type of material used to construct the road, and so forth. Park area cost 404 indicates the total cost for developing a given area into parkland. Park area cost 404 could include costs for developing pathways, playgrounds, signage, and other elements typically associated with parkland.

Referring back now to FIG. 3, revenue data 320 describes the unit revenue for various sources of revenue associated with the development of a physical property, including unit revenue 322(0) through 322(N). A given unit revenue 322 specifies the revenue generated per unit for different items or elements commonly included in urban development projects, such as an estimated sale price for a house, an estimated sale price for a parking space, and so forth.

Figure 4B:
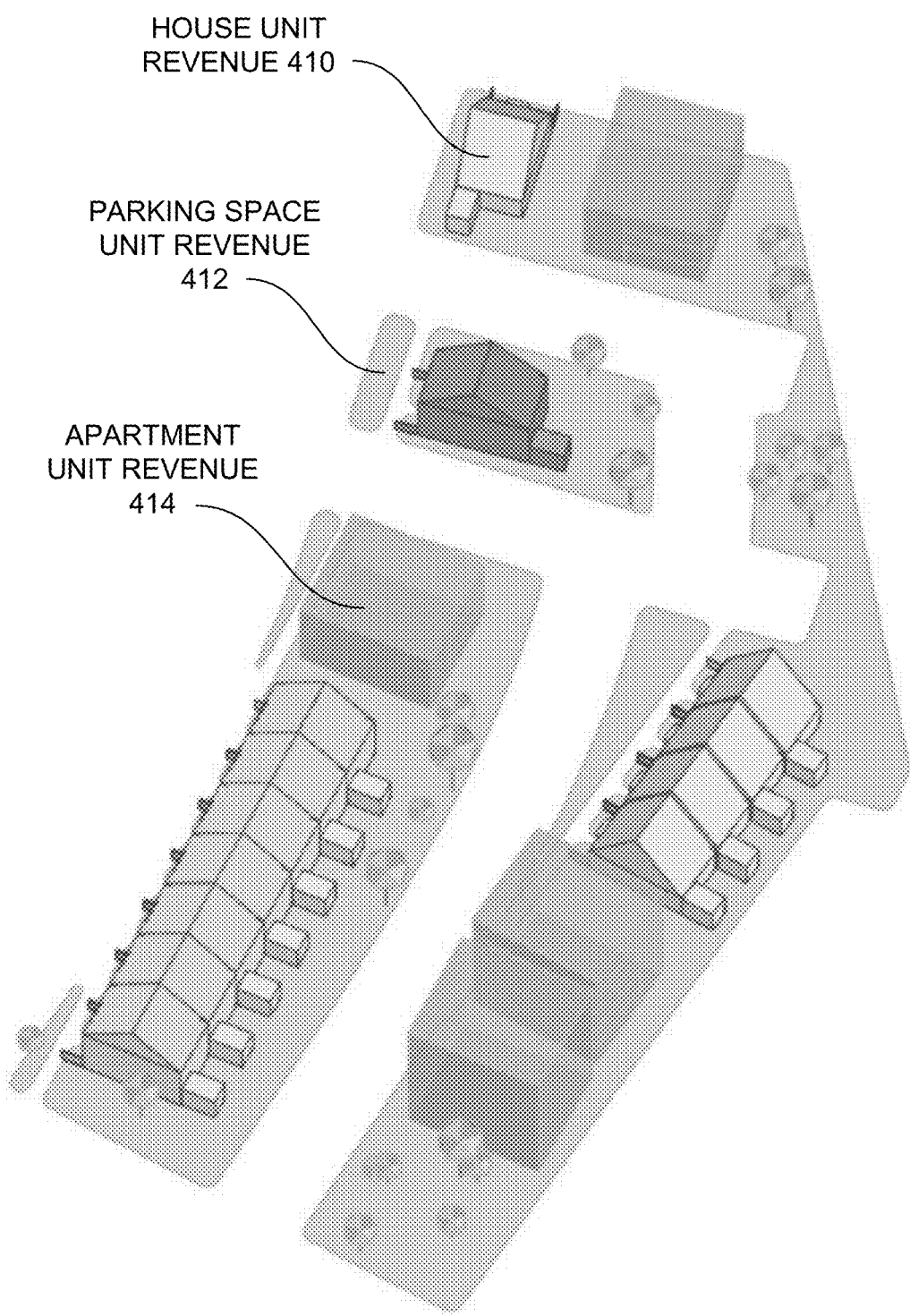

For example, referring now to FIG. 4B, house unit revenue 410 could indicate the revenue expected to be generated by the sale of a house having a given type. House unit revenue 410 could be computed based on a comparative market analysis with other similar houses, among other approaches to valuing a house. Parking space unit revenue 412 indicates the revenue expected to be generated by the sale of a dedicated parking space. Parking space revenue 412 could be computed based on an estimated demand for dedicated parking spaces, among other approaches. Apartment unit revenue 414 could be generated based on a comparative market analysis with other nearby apartments, among other approaches to valuing an apartment.

Referring back now to FIG. 3, during operation of urban design pipeline 120, evaluation engine 210 evaluates a candidate design 206 based on cost data 310 to generate estimated cost 318. Evaluation engine 210 also further evaluates the candidate design 206 based on revenue data 320 to generate estimated profit 328. In so doing, evaluation engine 210 analyzes various data included in the candidate design 206 that describes the quantities or portions of various elements and items included in the candidate design 206. As is shown, the candidate design 206 includes unit counts 302, linear unit distances 304, and square unit areas 306. Unit counts 302 could include, for example, number of house units to be built. Linear unit distances 304 could include, for example, a total linear amount of roadway to be built. Square unit areas 306 could include, for example, a total area of parkland to be built.

To generate estimated cost 318, evaluation engine 210 multiplies each unit count 302 by a corresponding unit cost 312 and accumulates the result. Evaluation engine 210 multiplies each linear unit distance 304 by a corresponding linear cost 314 and accumulates the result. Evaluation engine 210 multiplies each square unit area 306 by a corresponding area cost 316 and accumulates the result. Evaluation engine 210 aggregates the accumulated costs to generated estimated cost 318. To generate estimated profit 328, evaluation engine 210 multiplies unit counts 302 by a corresponding revenue source 322 and accumulates the result. Evaluation engine 210 then subtracts estimated cost 318 to generate estimated profit 328.

Figure 5:
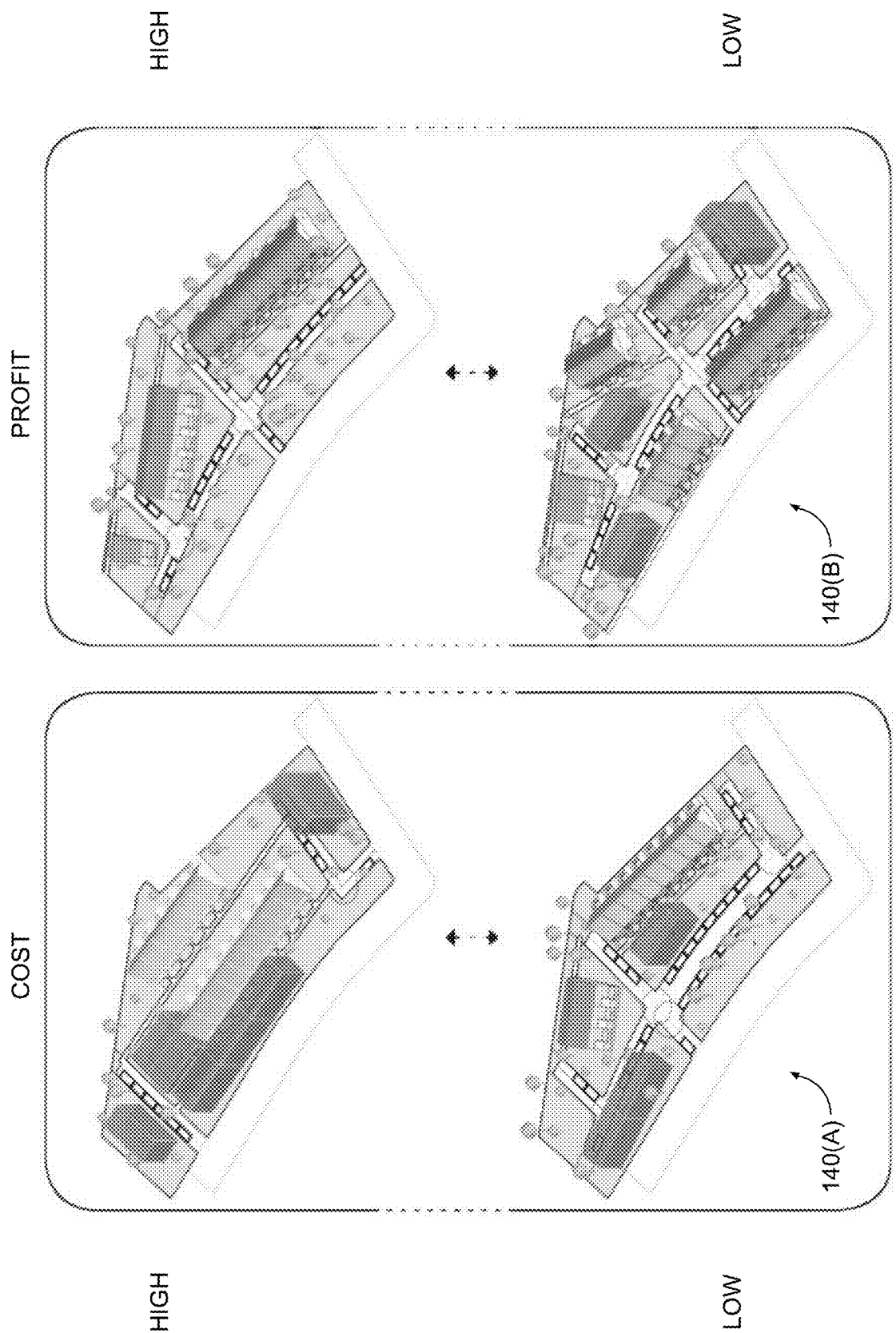
FIG. 5 illustrates multiple different exemplary design options generated by the urban design pipeline of FIG. 2, according to various embodiments of the present invention.

As mentioned above, financial model 220 can have any technically feasible structure and, more generally, can be any technically feasible type of data. In one embodiment, financial model 220 is a program that computes estimated cost 318 and estimated profit 328 automatically based on candidate design 206. Evaluation engine 210 processes financial model 220 when generating specific design metrics 212 that reflect the degree to which a given candidate design 206 meets various financial objectives. FIG. 5 illustrates different design options that meet different financial objectives to varying degrees.

Exemplary Design Options Generated to Meet Financial Objectives

FIG. 5 illustrates multiple different exemplary design options generated by the urban design pipeline of FIG. 2, according to various embodiments of the present invention. As shown, design options 140(A) are ranked according to cost, while design options 140(B) are ranked according to profit. Each one of design options 140(A) and 140(B) meet design criteria 204 and are therefore considered feasible designs, as discussed. In addition, each one of design options 140(A) and 140(B) optimize design objectives 204 to varying degrees. However, some design options 140(A) optimize cost better than others, while some design options 140(B) optimize profit better than others.

Evaluation engine 210 can rank design options 140 in the manner shown because cost and profit are separate objectives that may need to be considered separately. For example, the consideration of cost for any given design option 140 could depend on an available budget, regardless of estimated profit. Evaluation engine 210 ranks design options 140 in the manner shown to allow stakeholders in the urban design project to analyze tradeoffs between cost and profit. In some cases, the design option 140(B) with the highest profit may also be the design option 140(A) with the lowest cost, thereby representing a low-risk tradeoff between cost and profit. However, in other cases, the design option 140(B) with the highest profit may also be the design option 140(A) with the highest cost, thereby representing a high-risk tradeoff between cost and profit. Ranking design options 140(A) and 140(B) in the manner shown allows a more informed analysis of design options 140 to be performed.

Procedure for Generating Design Options Based on Financial Objectives

Figure 6:
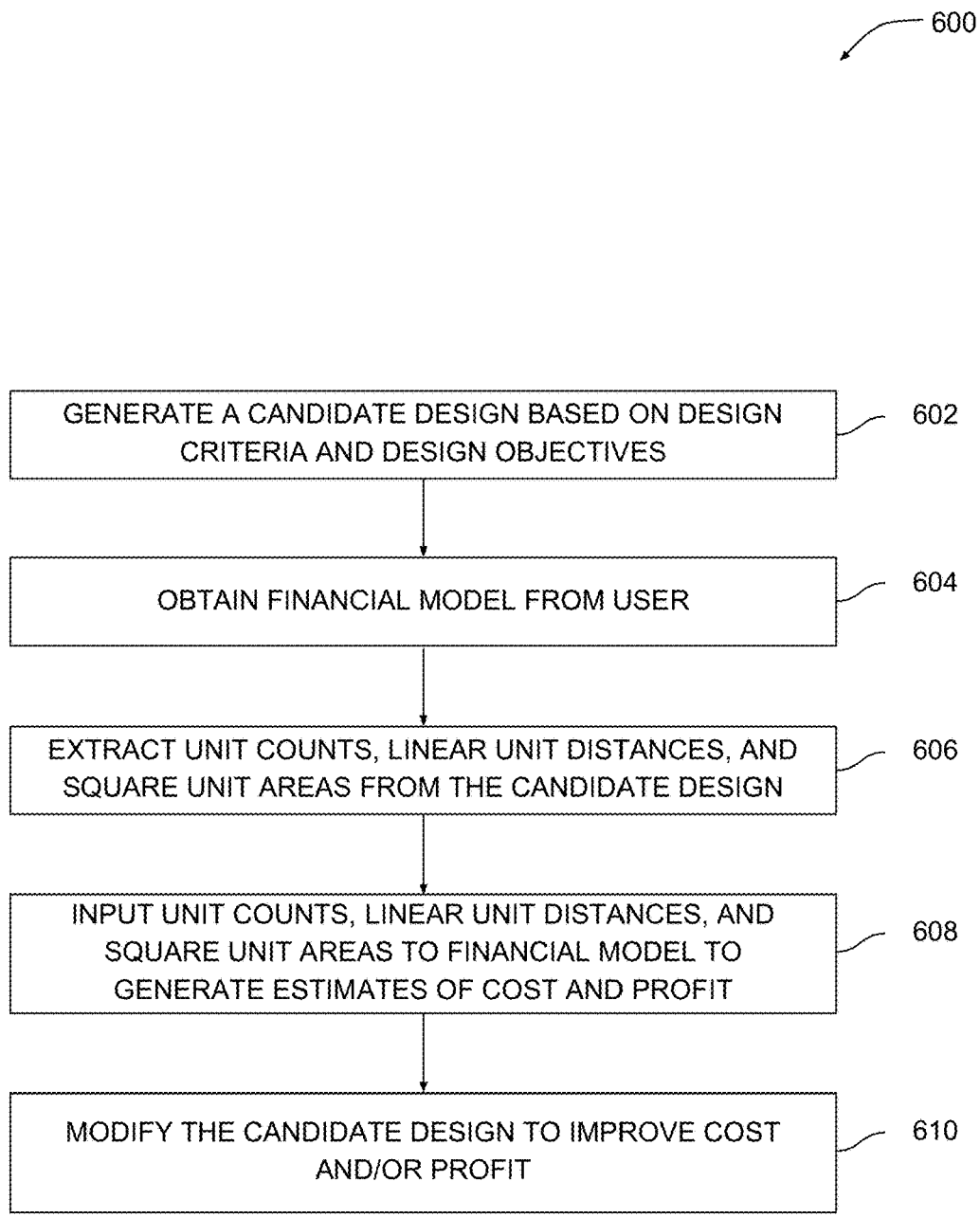
FIG. 6 is a flow diagram of method steps for automatically generating design options based on financial metrics, according to various embodiments of the present invention.

FIG. 6 is a flow diagram of method steps for automatically generating design options based on financial metrics, according to various embodiments of the present invention. Although the method steps are described in conjunction with the systems of FIGS. 1-5, persons skilled in the art will understand that any system configured to perform the method steps in any order falls within the scope of the present invention.

As shown, a method 600 begins at step 602, where geometry engine 200 within urban design pipeline 210 generates a candidate design based on design criteria and design objectives. The design criteria include design constraints describing features and/or attributes of designs that should be avoided when generating candidate designs. For example, a given design constraint could indicate regions of a physical property where the construction of structures cannot occur. The design criteria also include design requirements describing features and/or attributes of designs that should be included within candidate designs. For example, a given design requirement could indicate one or more required orientations for structures. The design objectives include one or more financial objectives for candidate designs that quantify various financial attributes of a given design. For example, a particular financial objective could be to minimize the cost of developing the physical property.

At step 604, evaluation engine 210 obtains a financial model from the user. The financial model is a data structure and associated functions for estimating cost and profit associated with the development of a physical property based on a given candidate design 206. The financial model indicates per unit costs, per linear unit costs, and per area unit costs, as well as estimated per unit revenue for various sources of revenue. The per unit costs reflect the cost for individual items. The per linear unit costs indicate the cost for portions of items measured in linear units, such as cable and wire, while the per area unit costs indicate the cost for portions of items measure in area units, such as carpeting and linoleum. The per unit revenue reflects the sale price for individual items, including houses and apartment units. In one embodiment, the financial model may be a spreadsheet of data cells indicating various costs and sources of revenue associated with different elements of candidate designs. The spreadsheet may include a designated input for data derived from the candidate design, and a designated output for outputting cost and profit estimates. The financial model is generally provided by a stakeholder of the urban design project.

At step 606, evaluation engine 210 extracts unit counts, linear unit distances, and/or square unit areas from the candidate design generated at step 602. The unit counts indicate the number of different individual unit items included in the candidate design. Those unit items could include pre-fabricated items such as doors and appliances, for example, as well as construction materials such as sheets of drywall and pieces of lumber. The unit items could also include small items such as door knobs and light switches, for example, as well as large items such as houses and play structures. The linear unit distances indicate linear portions of items included the candidate design that are measured by the linear unit, such linear portions of copper wire, linear portions of coaxial cable, linear portions of lumber, and so forth. The square unit areas indicate portions of items included in the candidate design that are measured in square units, such as tile and other types of flooring, landscaping areas, parkland, and so forth.

At step 608, evaluation engine 210 inputs the unit counts, linear unit distances, and square unit areas extracted at step 606 to financial model in order to generate estimates of cost and profit for the design option. To generate the estimate of cost, evaluation engine 210 multiples each unit count by a corresponding unit cost, multiplies each linear unit distance by a corresponding linear cost, multiplies each square unit area by a corresponding area cost, and aggregates the results. Evaluation engine 210 can generate the estimate of cost using a variety of valuation techniques. For example, evaluation engine 210 could estimate cost based entirely on per item costs. Alternatively, evaluation engine 210 could estimate cost via a combination of per linear unit costs and per area unit costs. To generate the estimate of profit, evaluation engine 210 multiples each unit count by a corresponding unit revenue and aggregates the results. Evaluation engine 210 then subtracts the total cost to produce the estimate of profit for the candidate design.

At step 610, geometry engine 200 modifies the candidate design to improve the cost and/or profit estimate for the candidate design. In one embodiment, geometry engine 200 may implement a multi-objective solver and/or a topology generator to modify the candidate design. Evaluation engine 210 then evaluates the modified candidate design in the manner described in conjunction with step 608 to determine whether the estimated cost and/or estimated profit associated with the modified candidate design have improved. In one embodiment, geometry engine 200 and evaluation engine 210 operate iteratively to improve candidate designs until specific financial objectives associated with cost and/or profit, among others, are met.

In sum, an urban design pipeline automatically generates design options for an urban design project based on a financial model. The urban design pipeline includes a geometry engine that generates candidate designs to meet various design criteria and design objectives associated with the urban design project. The urban design pipeline also includes an evaluation engine that evaluates the candidate designs based on the financial model. The financial model quantifies the financial performance of any given candidate design. The urban design pipeline operates iteratively to improve the candidate designs until one or more convergence criteria are met, thereby generating a set of design options with acceptable financial performance.

At least one technological advantage of the disclosed urban design pipeline is that design options can be automatically generated to meet the financial objectives of the urban design project. Accordingly, design options can be generated much faster than conventional approaches that require multiple sequential phases and multiple specialists. In addition, designers are no longer required to repeat the design phase of the design process in order to remedy underperforming designs. Thus, the process of generating designs can be greatly expedited compared to conventional, manual techniques. These technological advantages represent multiple technological advancements relative to prior art approaches.

1. Some embodiments include a computer-implemented method for generating designs for an urban design project via a computer-aided design (CAD) application, the method comprising generating, via a geometry engine included in the CAD application, first geometry associated with a first candidate design, wherein the first geometry meets a first design criterion associated with a region of land, generating, via an evaluation engine included in the CAD application, a first metric for the first candidate design based on a financial model, wherein the first metric indicates a first amount of capital associated with developing the region of land according to the first candidate design, determining that the first metric does not meet a second design criterion that is associated with the financial model, automatically modifying, via the geometry engine, the first geometry based on the first metric to generate second geometry associated with a second candidate design, wherein the second metric indicates a second amount of capital associated with developing the region of land according to the second candidate design, and determining that the second metric meets the second design criterion, thereby indicating that the second candidate design is a higher ranked design than the first candidate design.

2. The computer-implemented method of clause 1, wherein the first amount of capital includes a first cost associated with building a first structure on the region of land, and wherein generating the first metric comprises determining a total cost associated with building a first set of structures on the region of land based on the first amount of capital and a number of structures included in the first set of structures.

3. The computer-implemented method of any of clauses 1-2, wherein the first cost comprises at least one of a unit cost associated with the first structure, a linear unit cost associated with a portion of the first structure, and an area unit cost associated with the portion of the first structure.

4. The computer-implemented method of any of clauses 1-3, wherein the first amount of capital includes a first amount of revenue generated by selling a first structure built on the region of land, and wherein generating the first metric comprises determining a total amount of revenue generated by selling a first set of structures indicated in the first candidate design based on the first amount of capital and a number of structures included in the first set of structures, and subtracting a total cost of building the first set of structures from the total amount of revenue to generate a total profit earned by selling the first set of structures.

5. The computer-implemented method of any of clauses 1-4, wherein the first amount of revenue is determined based on a comparative market analysis between the first structure and one or more other structures.

6. The computer-implemented method of any of clauses 1-5, further comprising generating the second metric for the second candidate design based on the financial model, wherein the financial model indicates a second amount of capital associated with developing the region of land according to the second candidate design.

7. The computer-implemented method of any of clauses 1-6, wherein the financial model includes a set of costs associated with developing the region of land according to the first candidate design and a set of revenue sources associated with developing the region of land according to the first candidate design.

8. The computer-implemented method of any of clauses 1-7, wherein the financial model includes a designated input for at least one attribute of a given candidate design and a designated output for a metric corresponding to the given candidate design.

9. The computer-implemented method of any of clauses 1-8, wherein the financial model includes a set of functions that are evaluated to generate the first metric.

10. The computer-implemented method of any of clauses 1-9, wherein the second design criterion includes at least one of a maximum cost, a minimum revenue, and a minimum profit.

11. Some embodiments include a non-transitory computer-readable medium storing program instructions that, when executed by one or more processors, causes the one or more processors to generate designs for an urban design project via a computer-aided design (CAD) application by performing the steps of generating, via a geometry engine included in the CAD application, first geometry associated with a first candidate design, wherein the first geometry meets a first design criterion associated with a region of land, generating, via an evaluation engine included in the CAD application, a first metric for the first candidate design based on a financial model, wherein the first metric indicates a first amount of capital associated with developing the region of land according to the first candidate design, determining that the first metric does not meet a second design criterion that is associated with the financial model, automatically modifying, via the geometry engine, the first geometry based on the first metric to generate second geometry associated with a second candidate design, wherein the second metric indicates a second amount of capital associated with developing the region of land according to the second candidate design, and determining that the second metric meets the second design criterion, thereby indicating that the second candidate design is a higher ranked design than the first candidate design.

12. The non-transitory computer-readable medium of clause 11, wherein the first amount of capital includes a first cost associated with building a first structure on the region of land, and wherein the step of generating the first metric comprises determining a total cost associated with building a first set of structures on the region of land based on the first amount of capital and a number of structures included in the first set of structures.

13. The non-transitory computer-readable medium of any of clauses 11-12, wherein the first cost comprises at least one of a unit cost associated with the first structure, a linear unit cost associated with a portion of the first structure, and an area unit cost associated with the portion of the first structure.

14. The non-transitory computer-readable medium of any of clauses 11-13, wherein the first amount of capital includes a first amount of revenue generated by selling a first structure built on the region of land, and wherein the step of generating the first metric comprises determining a total amount of revenue generated by selling a first set of structures included in the first candidate design based on the first amount of capital and a number of structures included in the first set of structures, and subtracting a total cost of building the first set of structures from the total amount of revenue to generate a total profit earned by selling the first set of structures.

15. The non-transitory computer-readable medium of any of clauses 11-14, wherein the first amount of revenue is determined based on a comparative market analysis between the first structure and one or more other structures.

16. The non-transitory computer-readable medium of any of clauses 11-15, further comprising the step of generating the second metric for the second candidate design based on the financial model, wherein the financial model indicates a second amount of capital associated with developing the region of land according to the second candidate design.

17. The non-transitory computer-readable medium of any of clauses 11-16, wherein the financial model includes a set of costs associated with developing the region of land according to the first candidate design and a set of revenue sources associated with developing the region of land according to the first candidate design.

18. The non-transitory computer-readable medium of any of clauses 11-17, wherein the financial model includes a designated input for at least one attribute of a given candidate design, a designated output for a metric corresponding to the given candidate design, and a set of functions that are evaluated by the evaluation engine to generate the first metric.

19. The non-transitory computer-readable medium of any of clauses 11-18, wherein the first design criterion constrains the placement of a first set of structures included in the first candidate design to occur within a first portion of the region of land and to not occur within a second portion of the region of land.

20. Some embodiments include a system, comprising a memory storing an urban design pipeline, and a processor that, when executing the urban design pipeline, is configured to perform the steps of generating, via a geometry engine included in the CAD application, first geometry associated with a first candidate design, wherein the first geometry meets a first design criterion associated with a region of land, generating, via an evaluation engine included in the CAD application, a first metric for the first candidate design based on a financial model, wherein the first metric indicates a first amount of capital associated with developing the region of land according to the first candidate design, determining that the first metric does not meet a second design criterion that is associated with the financial model, automatically modifying, via the geometry engine, the first geometry based on the first metric to generate second geometry associated with a second candidate design, wherein the second metric indicates a second amount of capital associated with developing the region of land according to the second candidate design, and determining that the second metric meets the second design criterion, thereby indicating that the second candidate design is a higher ranked design than the first candidate design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for an urban design project with acceptable financial performance, the method comprising:
    generating, via a computer-aided design (CAD) application, first geometry associated with a first candidate design;
    generating, via the CAD application, a first metric for the first candidate design based on a financial model, wherein the first metric indicates a first amount of revenue associated with developing a region of land according to the first candidate design, wherein the first amount of revenue is generated by selling a first structure indicated in the first candidate design;
    determining that the first metric does not meet a design objective representing a financial objective associated with the financial model;
    automatically modifying the first geometry based on the first metric to generate second geometry associated with a second candidate design;
    generating a second metric for the second candidate design based on the financial model;
    determining that the second metric meets the design objective; and
    displaying the second metric to indicate a degree to which the second candidate design meets the financial objective.

2. The computer-implemented method of claim 1, wherein the second metric meeting the design objective indicates that the second candidate design is a higher ranked design than the first candidate design.

3. The computer-implemented method of claim 1, wherein the first geometry meets a different design objective associated with the region of land.

4. The computer-implemented method of claim 1, wherein the first metric further indicates a first amount of capital associated with developing the region of land according to the first candidate design.

5. The computer-implemented method of claim 4, wherein the first amount of capital includes a first cost associated with building a first structure on the region of land.

6. The computer-implemented method of claim 5, wherein the first cost comprises at least one of a unit cost associated with the first structure, a linear unit cost associated with a portion of the first structure, or an area unit cost associated with the portion of the first structure.

7. The computer-implemented method of claim 4, wherein generating the first metric comprises determining a total cost associated with building a first set of structures on the region of land based on the first amount of capital and a number of structures included in the first set of structures.

8. The computer-implemented method of claim 1, wherein generating the first metric comprises:
    determining a total amount of revenue generated by selling a first set of structures indicated in the first candidate design based on the first amount of revenue and a number of structures included in the first set of structures; and
    subtracting a total cost of building the first set of structures from the total amount of revenue to generate a total profit earned by selling the first set of structures.

9. The computer-implemented method of claim 4, wherein the second metric indicates a second amount of capital associated with developing the region of land according to the second candidate design.

10. One or more non-transitory computer-readable media storing instructions that, when executed by one or more processors, causes the one or more processors to generate designs for an urban design project with acceptable financial performance by performing the steps of:
    generating, via a computer-aided design (CAD) application, first geometry associated with a first candidate design;
    generating, via the CAD application, a first metric for the first candidate design based on a financial model, wherein the first metric indicates a first amount of revenue associated with developing a region of land according to the first candidate design, wherein the first amount of revenue is generated by selling a first structure indicated in the first candidate design;
    determining that the first metric does not meet a design objective representing a financial objective associated with the financial model;
    automatically modifying the first geometry based on the first metric to generate a second candidate design;
    generating a second metric for the second candidate design based on the financial model; and
    determining that the second metric meets the design objective; and
    displaying the second metric to indicate a degree to which the second candidate design meets the financial objective.

11. The one or more non-transitory computer-readable media of claim 10, wherein the first metric further indicates a first amount of capital associated with developing the region of land according to the first candidate design.

12. The one or more non-transitory computer-readable media of claim 11, wherein the first amount of capital includes a first cost associated with building a first structure on the region of land.

13. The one or more non-transitory computer-readable media of claim 12, wherein the first cost comprises at least one of a unit cost associated with the first structure, a linear unit cost associated with a portion of the first structure, or an area unit cost associated with the portion of the first structure.

14. The one or more non-transitory computer-readable media of claim 11, wherein generating the first metric comprises determining a total cost associated with building a first set of structures on the region of land based on the first amount of capital and a number of structures included in the first set of structures.

15. The one or more non-transitory computer-readable media of claim 10, wherein the design objective includes at least one of a maximum cost, a minimum revenue, and a minimum profit.

16. The one or more non-transitory computer-readable media of claim 11, wherein the second metric indicates a second amount of capital associated with developing the region of land according to the second candidate design.

17. A system, comprising:
one or more memories storing instructions; and
one or more processors that, when executing the instructions, are configured to generate designs for an urban design project with acceptable financial performance by performing the steps of:
generating, via a computer-aided design (CAD) application, first geometry associated with a first candidate design,
generating, via the CAD application, a first metric for the first candidate design based on a financial model, wherein the first metric indicates a first amount of revenue associated with developing a region of land according to the first candidate design, wherein the first amount of revenue is generated by selling a first structure indicated in the first candidate design,
determining that the first metric does not meet a design objective representing a financial objective associated with the financial model;
automatically generating a second candidate design based on one or more modifications to the first geometry;
generating a second metric for the second candidate design based on the financial model;
determining that the second metric meets the design objective; and
displaying the second metric to indicate a degree to which the second candidate design meets the financial objective.

18. The system of claim 17, wherein automatically generating the second candidate design comprises automatically modifying the first geometry to generate second geometry associated with the second candidate design.

* * * * *